(12) United States Patent
Sprecher

(10) Patent No.: US 7,612,554 B2
(45) Date of Patent: Nov. 3, 2009

(54) BIPOLAR INTERROGATION FOR MAGNETOSTRICTIVE TRANSDUCERS

(75) Inventor: Arnold F. Sprecher, Raleigh, NC (US)

(73) Assignee: MTS Systems Corporation, Eden Prairie, MN (US)

( * ) Notice: Subject to any disclaimer, the term of this patent is extended or adjusted under 35 U.S.C. 154(b) by 0 days.

(21) Appl. No.: 11/935,879

(22) Filed: Nov. 6, 2007

(65) Prior Publication Data

US 2008/0088302 A1 Apr. 17, 2008

Related U.S. Application Data

(63) Continuation of application No. 10/419,447, filed on Apr. 21, 2003, now Pat. No. 7,292,025.

(51) Int. Cl.
*G01B 7/14* (2006.01)
(52) U.S. Cl. ............... 324/207.13; 324/207.14; 333/148
(58) Field of Classification Search ............ 324/207.13, 324/207.24, 207.22; 333/148
See application file for complete search history.

(56) References Cited

U.S. PATENT DOCUMENTS

| 2,552,139 | A | 5/1951 | Bocciarelli | 315/393 |
| 3,013,247 | A | 12/1961 | Kietz | 367/137 |
| 3,034,095 | A | 5/1962 | Kietz | 367/109 |
| 3,221,231 | A | 11/1965 | Reich | 318/129 |
| 3,228,010 | A | 1/1966 | Ruhman | 365/157 |
| 4,721,902 | A | 1/1988 | Tellerman et al. | 73/610 |
| 5,070,737 | A | 12/1991 | Reilly | 73/862.046 |
| 5,076,100 | A | 12/1991 | Hunter et al. | 73/290 |
| 5,212,444 | A | 5/1993 | Abramovich et al. | 324/207.13 |
| 5,334,933 | A | 8/1994 | Tellerman | 324/207.13 |
| 5,412,317 | A | 5/1995 | Kyoizumi | 324/207.14 |
| 6,271,660 | B1 | 8/2001 | Sprecher, Jr. | 324/207.13 |
| 6,519,165 | B2 | 2/2003 | Koike | 363/21.12 |
| 6,583,615 | B1 | 6/2003 | Kathol | 324/207.13 |

*Primary Examiner*—Reena Aurora
(74) *Attorney, Agent, or Firm*—Steven M. Koehler; Westman, Champlin & Kelly, P.A.

(57) ABSTRACT

A magnetostrictive-based sensor is disclosed which obtains higher return signals through the use of multiple consecutive input pulses

15 Claims, 3 Drawing Sheets

BIPOLAR INTERROGATION FOR MAGNETOSTRICTIVE TRANSDUCERS

CROSS-REFERENCE TO RELATED APPLICATION

The present application is a continuation of and claims priority of U.S. patent application Ser. No. 10/419,447, filed Apr. 21, 2003, which is U.S. Pat. No. 7,292,025, which issued Nov. 6, 2007, the content of which is hereby incorporated by reference in its entirety.

BACKGROUND OF THE INVENTION

1. Field of the Invention

The present invention relates to magnet-based sensors and in particular magnet-based magnetostrictive sensors.

2. Description of the Art

Magnetostrictive transducers having elongated waveguides that carry torsional strain waves induced in the waveguide when current pulses are applied along the waveguide through a magnetic field are well known in the art. A typical linear distance measuring device using a movable magnet that interacts with the waveguide when current pulses are provided along the waveguide is shown in U.S. Pat. No. 3,898,555.

Devices of the prior art of the sort shown in U.S. Pat. No. 3,898,555 also have the sensor element in a housing which also houses the electronics to at least generate the pulse and receive the return signal. The amplitude of the return signal detected from the acoustical strain pulse is, as well known in the art, affected by many parameters. These parameters include the position magnet strength, waveguide quality, temperature, waveguide interrogation current, and assembly tolerances.

Several types of magnetic-based sensors are available for measuring linear or rotary position. Magnetic-based sensors have an advantage in that they provide non-contact sensing; so there are no parts to wear out. Examples of magnetic-based sensors are LVDTs, inductive sleeve sensors, and magnetostrictive sensors.

Magnetostrictive transducers require that their waveguide be interrogated with electric current. This magnetically energizes the waveguide, thereby launching the ultrasonic strain pulse that is detected at the end of the unit. When the strain pulse is converted to an electrical signal, it is referred to as the "return signal." The time between the interrogation pulse and the detection of the return signal defines location of position magnet.

Normally, the interrogation current in the waveguide flows in one direction for a short period of time (one to three microseconds) prior to detection at the return signal.

It is an object of the present invention to combine magnetostrictive interrogation pulses additionally to increase the amplitude of the return signal.

It is another object of the present invention to provide a magnetostrictive interrogation pulse voltage with a lower voltage power supply.

SUMMARY OF THE INVENTION

The present invention relates to a magnetostrictive device wherein multiple interrogation pulses originate from an interrogation source in sequence without delay time between the pulses. Eliminating substantial delay between positive and negative going current pulses induce a resonance in the waveguide for constructively additive return signals producing a resultant return signal which is of much higher voltage strength.

The interrogation current flows first in one direction and then is reversed and flows in the opposite direction. Preferably the interrogation current flows in the first direction as a third pulse immediately following the second pulse. The timing of these current flows, as well as the synchronization, are adjusted so that resonance between the two parts of the return signal is obtained. This results in a resonated return signal that is about twice as large as that which can be obtained with only a single direction interrogation pulse.

DESCRIPTION OF THE DRAWINGS

For a further understanding of the nature and objects of the present invention, reference should be had to the following figures in which like parts are given like reference numerals and wherein.

DETAILED DESCRIPTION OF ILLUSTRATIVE EMBODIMENTS

Figure 1:
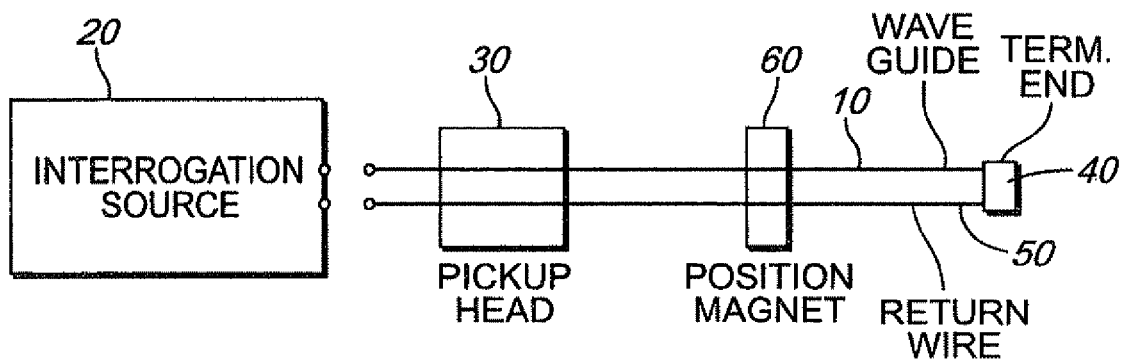
FIG. 1 is a schematic view of a linear magnetostrictive position sensor of the present invention.

As shown in FIG. 1, there is a typical assembly of a waveguide for magnetostrictive detection of a position of a magnet in close proximity to the waveguide. As shown in FIG. 1, a waveguide 10 extends from an interrogation source 20 through a pickup head 30 to its termination end 40. At its termination end 40, a return wire 50 is connected to the end 40 of waveguide 10 and also extends to pickup head 30 and from pickup head 30 to interrogation source 20. A position magnet 60 is mounted around or otherwise in close proximity to the return wire 50 and waveguide 10. Thus, in the prior art, the interrogation source, such as interrogation source 20, would introduce a current onto the waveguide 10 in the form of a single current pulse which would be returned by return wire 50 and the current pulse in interaction with the position magnet 60 would yield at pickup head 30 a detectable signal indicating the position of the position magnet 60 along waveguide 10. However, as shown in FIGS. 2 and 3, there is an effective resonance which is not known in the art.

Figure 2:
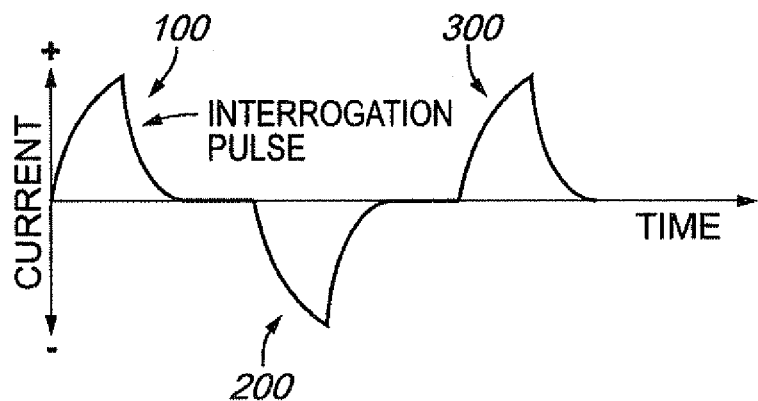
FIG. 2 is an illustration of interrogation pulses of opposing polarity.

As shown in FIG. 2, there is an interrogation pulse 100. Typically, interrogation pulse 100 is the only pulse introduced into a waveguide 10 as discussed above. However, as shown in FIG. 2, the current pulse does not have to be limited to pulse 100 but can continue as a negative going pulse 200 and maybe followed by a positive going pulse 300. This is not done in the art at the present time to the knowledge of the inventor.

Figure 3:
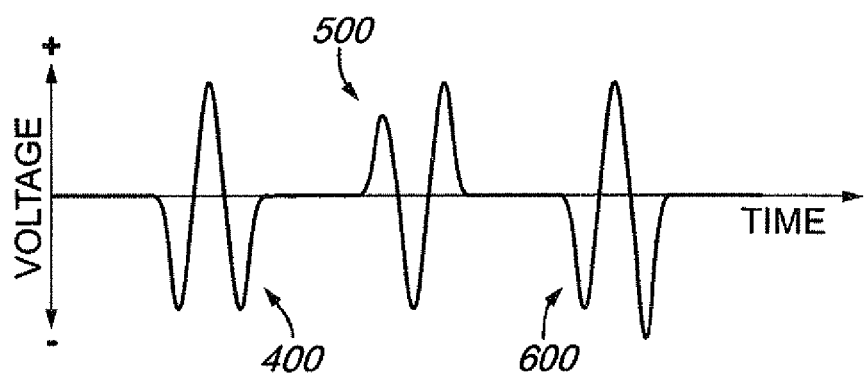
FIG. 3 is an illustration of the return signal from the magnetostrictive system in response to the interrogation pulse sequence of FIG. 2.

FIG. 3 shows the result on return pulses in a magnetostrictive system of having current pulses flow in opposite directions. If the current pulses are as shown in FIG. 2, the return pulses are as shown in FIG. 3. These return pulses correspond to the interrogation pulses 100, 200, and 300 and are indicated in FIG. 3 as return signals 400, 500, and 600, respectively. Return signal 500 is opposite polarity from return signals 400, 600, as the input pulse 200 is opposite in polarity to input pulses 100, 300, respectively. However, the input pulses 100, 200, 300 may be spaced in time differently than is shown in FIG. 2 by adjusting when the signals are positive and negative going.

Figure 4:
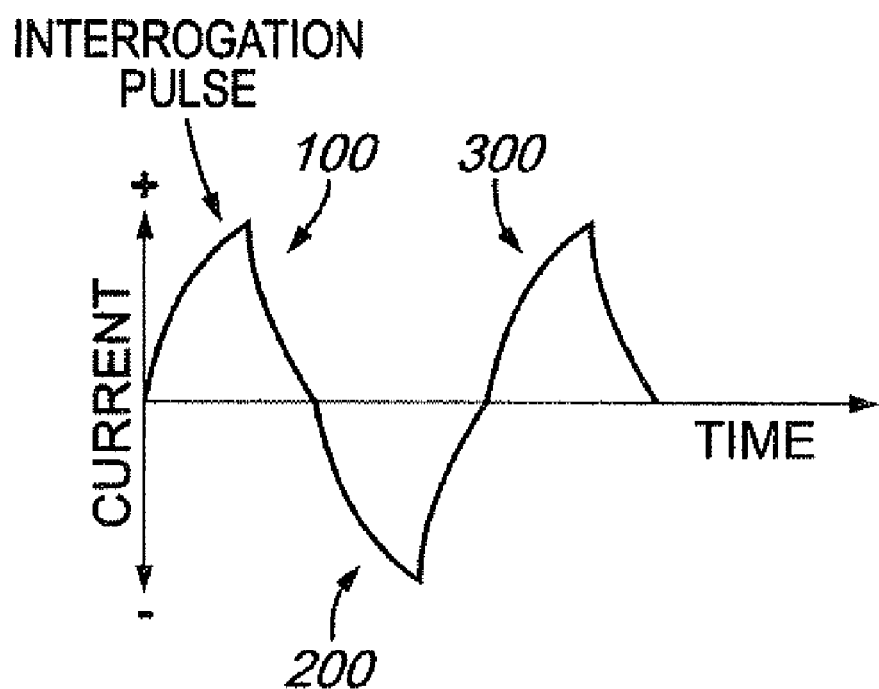
FIG. 4 is an illustration of interrogation pulses for the magnetostrictive system without spacing between the pulses.
Figure 5:
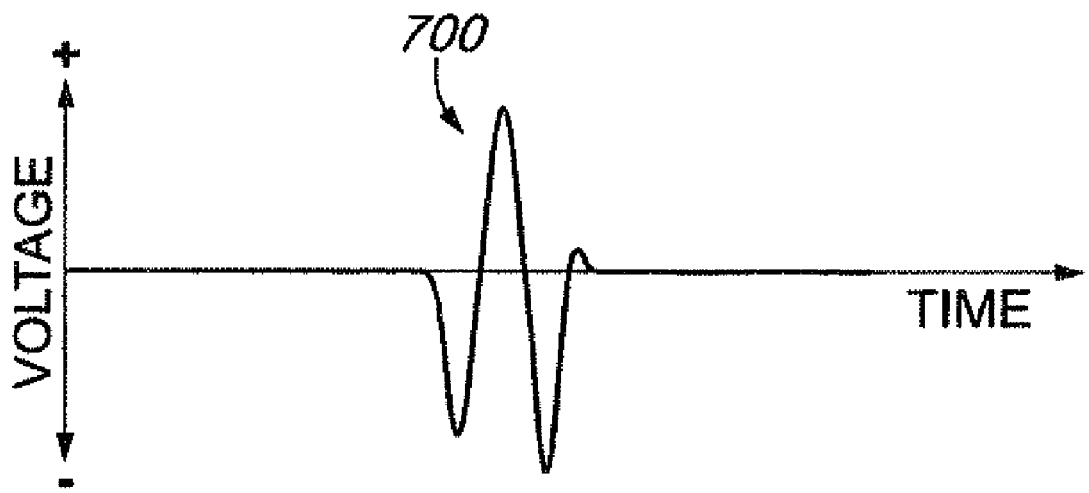
FIG. 5 is an illustration of the return signal of the magnetostrictive system in response to the interrogation pulses of FIG. 4.

In FIG. 4, the interrogation pulses 100, 200, 300 no longer have any delay time between them, as they did in FIG. 2, but are substantially one on top of the other. By doing so, a resonance is induced in the waveguide 10 so that the return signals as shown in FIG. 5 are constructively additive for a return signal 700, which has a much higher voltage strength (approximately twice that of the individual return pulses of FIG. 3) to help in, first, detection of the return signal and, second, to improve the signal-to-noise ratio of the signal.

Figure 6:
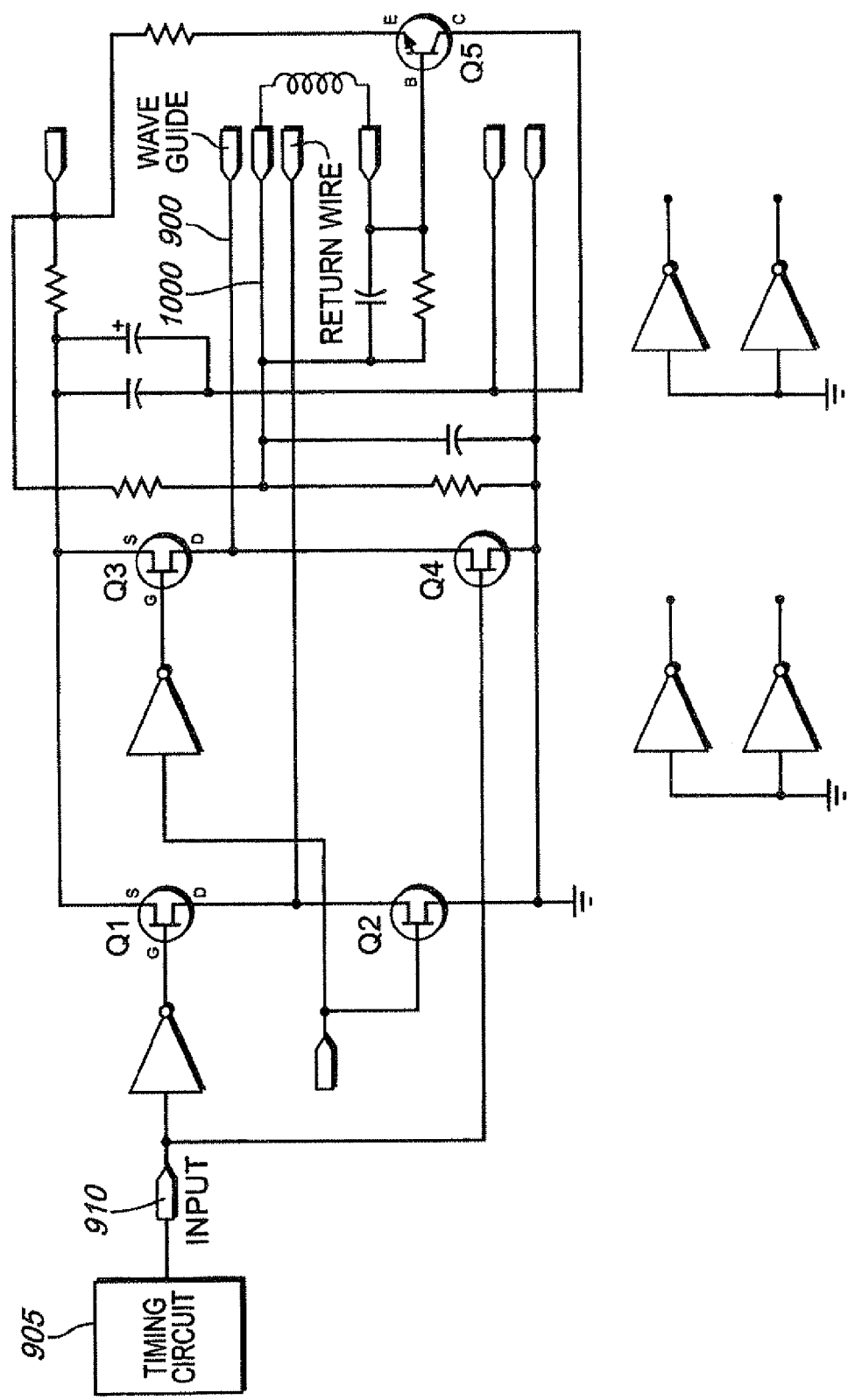
FIG. 6 is a schematic of an illustrative circuit which is used to create the pulses of FIG. 4.

FIG. 6 shows an illustrative circuit that may be used to create the pulses. As shown in FIG. 6, the circuit is essentially a bridge driver circuit 910 to generate bi-directional current pulses. Waveguide 10 is connected to the output 900 of the bridge circuit, and the return wire 50 is connected to the other output 1000 of the bridge circuit. A timing circuit 905 well known in the art is connected to the input end of the bridge circuit 910, driving the bridge circuit 910 to alternatively produce the positive and negative going current signals.

Additional superiorities for the bipolar interrogation pulses additively raising the return signal are:

1. Being able to achieve a specified output from the waveguide using a lower voltage supply, such as using the lowest voltage possible in order to supply the waveguide to reach the desired voltage. This is an advantage for making an intrinsically safe sensor, wherein a higher input voltage that more easily can ignite the atmosphere if a spark occurs is no longer needed.
2. If the power supply voltage for the input pulse is limited because of the application, such as a mobile unit, the higher output that one can obtain from that given voltage also allows one to achieve a better signal-to-noise ratio.

Because many varying and different embodiments may be made within the scope of the invention concept taught herein which may involve many modifications in the embodiments herein detailed in accordance with the descriptive requirements of the law, it is to be understood that the details herein are to be interpreted as illustrative and not in a limiting sense.

What is claimed is:

1. A magnetostrictive transducer, comprising:
a magnetostrictive waveguide;
a return wire connected to the magnetostrictive waveguide;
a magnet movable in close proximity to the magnetostrictive waveguide; and
a bipolar driver circuit coupled to the magnetostrictive waveguide, said bipolar driver circuit configured to generate at least two consecutive current pulses of opposite polarity, wherein the current pulses of opposite polarity are timed to generate a return pulse along the magnetostrictive waveguide that has an amplitude larger than if the return pulse was from a single current pulse.

2. The magnetostrictive transducer of claim 1, wherein the bipolar driver circuit comprises a bridge driver circuit.

3. The magnetostrictive transducer of claim 1, wherein the bipolar driver circuit comprises an intrinsically safe circuit.

4. The magnetostrictive transducer of claim 1 wherein the magnetostrictive waveguide comprises a linear magnetostrictive position sensor.

5. The magnetostrictive transducer of claim 4 further comprising a termination end, and the magnetostrictive waveguide and the return wire connect to one another at the termination end.

6. A magnetostrictive transducer, comprising:
a magnetostrictive waveguide;
a return wire connected to the magnetostrictive waveguide;
a magnet movable in close Proximity to the magnetostrictive waveguide; and
a bipolar driver circuit coupled to the magnetostrictive waveguide, said bipolar driver circuit configured to generate at least two consecutive current pulses of opposite polarity wherein the magnetostrictive waveguide comprises a resonance that generates the return pulse such that the return pulse is constructively additive.

7. The magnetostrictive transducer of claim 6 further comprising a termination end, and the magnetostrictive waveguide and the return wire connect to one another at the termination end.

8. The magnetostrictive transducer of claim 6 further comprising a pickup head and wherein the magnetostrictive waveguide extends through the pickup head.

9. A magnetostrictive transducer, comprising:
a magnetostrictive waveguide with a resonance;
a magnet movable in close proximity to the magnetostrictive waveguide; and
a bipolar driver circuit coupled to the magnetostrictive waveguide, said bipolar driver circuit configured to generate at least two consecutive current pulses of opposite polarity that are timed such that the resonance generates a constructively additive return pulse.

10. The magnetostrictive transducer of claim 9, wherein the bipolar driver circuit comprises a bridge driver circuit.

11. The magnetostrictive transducer of claim 9, wherein the bipolar driver circuit comprises an intrinsically safe circuit.

12. The magnetostrictive transducer of claim 9 wherein the current pulses of opposite polarity are timed to generate a return pulse along the magnetostrictive waveguide that has an amplitude larger than if the return pulse was from a single current pulse.

13. The magnetostrictive transducer of claim 9 wherein the magnetostrictive waveguide comprises a linear magnetostrictive position sensor.

14. The magnetostrictive transducer of claim 9 further comprising a return wire and a termination end, and the magnetostrictive waveguide and the return wire connect to one another at the termination end.

15. The magnetostrictive transducer of claim 14 wherein the magnetostrictive waveguide comprises a linear magnetostrictive position sensor.

* * * * *